United States Patent [19]

Hart

[11] 4,182,662

[45] Jan. 8, 1980

[54] METHOD OF FORMING HYDROGEN

[75] Inventor: Thomas G. Hart, Royal Oak, Mich.

[73] Assignee: Energy Development Associates, Inc., Madison Heights, Mich.

[21] Appl. No.: 925,980

[22] Filed: Jul. 19, 1978

[62] Division of Ser. No. 86,258, Oct. 18, 1979, and a division of Ser. No. 56,915, Jul. 12, 1979.

[51] Int. Cl.$^2$ .......................... C25B 1/00; C25B 1/02; C25B 1/26
[52] U.S. Cl. ................................. 204/101; 204/128; 204/129
[58] Field of Search ....................... 204/128, 129, 101; 423/486, 481

[56] References Cited

U.S. PATENT DOCUMENTS

| | | | |
|---|---|---|---|
| 3,336,209 | 8/1967 | Hirschberg | 204/128 |
| 3,458,411 | 7/1969 | Grotheer et al. | 204/128 |

*Primary Examiner*—R. L. Andrews
*Attorney, Agent, or Firm*—Meyer, Tilberry & Body

[57] ABSTRACT

A method of forming hydrogen by electrolysis in a cell containing a hydrohalic acid produced from a reaction process using carbon particles as an input energy source wherein the acid for electrolysis is produced by reacting the electrolysis separated halogen with water and carbon particles in a reaction area communicated with the electrolysis cell. The reaction can also be made in the presence of a catalyst.

24 Claims, 6 Drawing Figures

METHOD OF FORMING HYDROGEN

This application is a patent application to a divisional application filed on Oct. 18, 1979 for Method of Forming Hydrogen, Ser. No. 86,258 and a divisional application filed Jul. 12, 1979 for Method of Forming Hydrogen, Ser. No. 56,915.

The present invention relates to the art of forming hydrogen and more particularly to a method of forming hydrogen by electrolysis of a halogen acid produced in accordance with a novel concept utilizing carbon, such as coke or coal.

The invention is particularly applicable for an electrolysis process employing hydrochloric acid or hydriodic acid, and it will be described with reference thereto; however, it is appreciated that the invention has broader applications and may be used with hydrobromic acid. The use of the process with the fluorine acid would electrochemically be appropriate; however, because of the highly active nature of fluorine, this particular halogen is not preferred. Also, the process can be used in a gas mode.

BACKGROUND OF INVENTION

The production of hydrogen is becoming quite desirable since hydrogen has beneficial aspects as a direct heating fuel or as a means for generating electrical energy in a fuel cell. Consequently, substantial efforts have been devoted to obtaining large volumes of hydrogen for subsequent use in heat or electrical energy generation. At this time, the most common method of producing hydrogen is electrolysis of water, which consumes a substantial amount of electrical energy since it requires over 2.0 volts D.C. for decomposition. As is well known, the higher the voltage necessary for electrolysis, the higher the electrical energy cost for the process. To reduce the cost of production of hydrogen, most efforts have been directed toward modifying the water electrolysis process in a manner to reduce the voltage required for the hydrolysis and, thus, the electrical energy required. For instance, it has been suggested that high pressure water electrolysis cells can be developed which will reduce the voltage from slightly over 2.0 volts to the general range of about 1.6–1.7 volts. Still, the production of hydrogen by the electrolysis of water will involve a substantial electrical energy input which will continue to render hydrolysis of water for the production of hydrogen an expensive process even though it may be commercially feasible in view of the versatility of the generated hydrogen.

The present invention relates to a novel method of producing hydrogen by electrolysis in a cell using a halogen acid such as hydrochloric acid, hydrobromic acid or hydriodic acid. In this manner, the electrolysis voltage can be reduced and the required electrical energy for the electrolysis process can be made lower than even the proposed improved processes for water electrolysis.

The electrolysis of halogen acid to produce hydrogen and the constituent halogen is a well known technology. This concept is shown in U.S. Pat. Nos. 603,058; 1,746,542; 3,236,760; 3,242,065 and 3,756,930. The present invention does not involve, as a novel feature, the concept of obtaining hydrogen from the electrolysis of the halogen acid; however, the invention relates to this general field and develops a novel method wherein this electrolysis process can be used for economic creation of hydrogen at a cost substantially below the cost of water electrolysis. Consequently, the invention relates to a method wherein the halogen acid electrolysis concept can be employed for the production of commercial quantities of hydrogen with an overall efficiency heretofore not obtainable. As will be described with respect to the present invention, the invention involves the concept of employing the electrolysis of the halogen acid in combination with a method of producing the acid in an efficient manner, which results in a sufficient quantity of the acid created at a low cost factor. The process is performed in a unit or device involving both the electrolysis cell and the acid forming reaction area which may be in the electrolysis cell itself or communicated therewith by conduits through which the halogen acid for the electrolysis process is circulated in liquid or gaseous form.

In summary of the background, the present invention relates to an improvement in producing hydrogen by employing the halogen acid electrolysis concept with a novel interacting and combined halogen acid producing concept.

THE INVENTION

In accordance with the present invention, the electrolysis cell for separation of hydrogen from a halogen acid incorporates a reaction area in which the acid is formed using the halogen released by the electrolysis process. In accordance with the broadest aspect of the invention, the reaction area is adjacent the halogen collecting area of the electrolysis cell and uses the halogen released by the cell, water and a reaction agent for creating additional halogen acid. When the acid is in solution, the solubility of the released halogen in the acid solution together with the hydrogenation efficiency of the present invention contributes to efficient replenishing of the halogen acid for subsequent electrolysis to produce hydrogen.

In one aspect of the invention, the reaction zone for creating additional acid for the electrolyte solution uses water and the disassociated halogen to create additional halogen acid. This chemical reaction requires rapid hydrogenation which is obtained, in accordance with one aspect of the invention, by using a catalyst such as graphitized carbon, ruthenised titanium or platinised titanium. These three catalysts are effective for hydrogenation to a certain acid concentration level which is approximately 5% for hydrochloric acid. In accordance with the preferred embodiment of the invention, the reaction in the reaction area of the method involves the use of ungraphitized carbon which enters into the chemical reaction to produce additional halogen acid and creates carbon dioxide as a by-product. This ungraphitized carbon, which is used in the preferred embodiment of the invention, allows the hydrogenation of the disassociated halogen beyond relatively acid concentrations which are obtainable by the catalyst concept employed in the present invention. The preferred embodiment employs a solution of halogen acid; however, a gaseous process can be used. The liquid process will be hereinafter explained. The halogen acid as used herein is hydrohalic, i.e. no combined oxygen.

The present invention involves the method of forming hydrogen by the electrolysis of the halogen acid in a solution, which method includes also the use of a reaction zone in which the halogen acid is replenished by reacting dissolved, electrochemically released halogen with water in the presence of a catalyst or in the presence of ungraphitized carbon. The latter preferred aspect of the method allows higher concentrations of the halogen acid by producing hydrogenation at concentration levels greater than the catalyst method and substantially greater than other known processes for obtaining halogen acid by reaction of a halogen directly with water. Thus, the present invention requires only the use of water to maintain the continuous operation of the hydrogen forming method. In the preferred embodiment water and ungraphitized carbon is used to increase the concentration of the halogen acid and thus the efficiency of the total electrolysis process. As can be seen, by using the present invention, hydrogen is released for use exterior of the cell. Only water or water and carbon must be introduced into the cell. The electrical working voltage of the cell is substantially less than an electrolysis cell used in the electrolysis of water. Consequently, by using only water as the input material hydrogen is obtained at an electrical efficiency not obtainable in a cell which produces hydrogen by direct electrolysis of water. In the present invention, the water is first converted into the halogen acid which is then efficiently converted into hydrogen and the halogen, which halogen is dissolved back into the electrolyte within the cell itself, reacts with water in the presence of the stated catalyst or ungraphitized carbon to again convert the water into the more efficiently decomposed halogen acid solution.

This novel method which will be described hereinafter in detail and defined in the appended claims hereof is not suggested by the known prior art. Production of a halogen acid, such as hydrochloric acid, by heated carbon and water is illustrated in U.S. Pat. Nos. 1,229,509; 1,420,209; 1,485,816; 1,695,522; 1,843,196; 1,843,354; 1,870,308; and 2,238,896. None of these patents suggest a method for producing hydrogen, nor the concept of using carbon particles in a reaction zone of an electrolysis cell to produce a halogen acid by using the released halogen. The present invention relates to the concept of obtaining hydrogen from water without the direct electrolysis of the water itself. U.S. Pat. No. 3,995,016 suggests a method of producing hydrogen from water wherein water vapor and iodine vapor is reacted to form hydrogen iodide which is then decomposed into hydrogen and iodine. This process reacts water vapor and iodine vapor in an initial step. The present invention relates to an electrolysis process wherein a solution of halogen acid is employed for the electrolysis process, which process is not suggested by this prior process of producing water and hydrogen from water using iodine. Another method of producing hydrogen and oxygen from water without the electrolysis of water is illustrated in U.S. Pat. No. 4,069,120. In this patent, the halogen and water is combined as gas which is radiated to form the hydrogen halide. Again, this process does not relate to the use of the disassociated halogen in an electrolysis process for recreating the depleted electrolyte acid. Also, no reaction zone employing a reaction agent is shown.

U.S. Pat. No. 4,021,323 relates to a system for producing hydrogen by the electrolysis of hydrogen iodide. In this arrangement, the hydrogen iodide is replaced by a chemical reaction with the released hydrogen and iodine in a water solution. The iodine is not dissolved in the electrolyte, which is then continuously replenished by reacting the dissolved iodine with water in the presence of carbon or a catalyst as disclosed in the present invention.

The prior art described in conjunction with the basic aspects of the present invention is incorporated herein as background information and to show the novelty of the simplified method of the present invention for producing hydrogen from water or water and carbon, preferably ungraphitized carbon.

In one aspect of the present invention, there is provided a method of forming halogen by electrolysis of the halogen acid produced from a reaction process using electrically released hydrogen dissolved in the solution. This method involves providing an electrolysis cell with a hydrogen electrode in a hydrogen collection area of the cell and a halogen electrode in a halogen collecting area of the cell. A solution of halogen acid is provided in the cell to form a liquid electrolyte with a known total working voltage. A continuous process is used for producing the halogen acid of the electrolyte used in the solution. This continuous process involves dissolving the electrically released hydrogen of the halogen electrode into the halogen acid solution at the halogen collecting area and reacting the dissolved halogen in a reaction area adjacent the halogen collecting area with the solution water of the electrolyte and in the presence of a catalyst selected from a group of graphitized carbon, ruthenised titanium and platinised titanium or ungraphitized carbon. This reaction creates hydrogenation of the dissolved halogen within the electrolyte solution to replenish the acid of the solution by the addition of only water or water and carbon. In the preferred embodiment, the carbon particles are ungraphitized carbon, such as coke. By using the dissolved halogen in the electrolyte the electrolyte and the dissolved halogen can be circulated through the reaction zone to produce a total unit wherein the continuous addition of water or water and coke allows continuous production of hydrogen by the electrolysis process.

The primary object of the present invention is the provision of a method of producing hydrogen by electrolysis, which method requires a less working potential than the hydrolysis of water.

Another object of the present invention is the provision of a method as defined above, which method utilizes a dilute solution of halogen acid into which acid the released halogen of the electrolysis process can be dissolved for replenishing the halogen acid of the electrolyte in a connected reaction zone by the addition of water or water and carbon.

Still a further object of the present invention is the provision of a method as defined above, which method can be used to convert coke and water to hydrogen by an electrolysis concept.

These advantages, the advantages discussed in relation to the prior art and other advantages, which will be apparent from the following description of the present invention, illustrate the advance in the art realized by the present invention when producing hydrogen.

PREFERRED EMBODIMENT OF THE INVENTION

Figure 1:
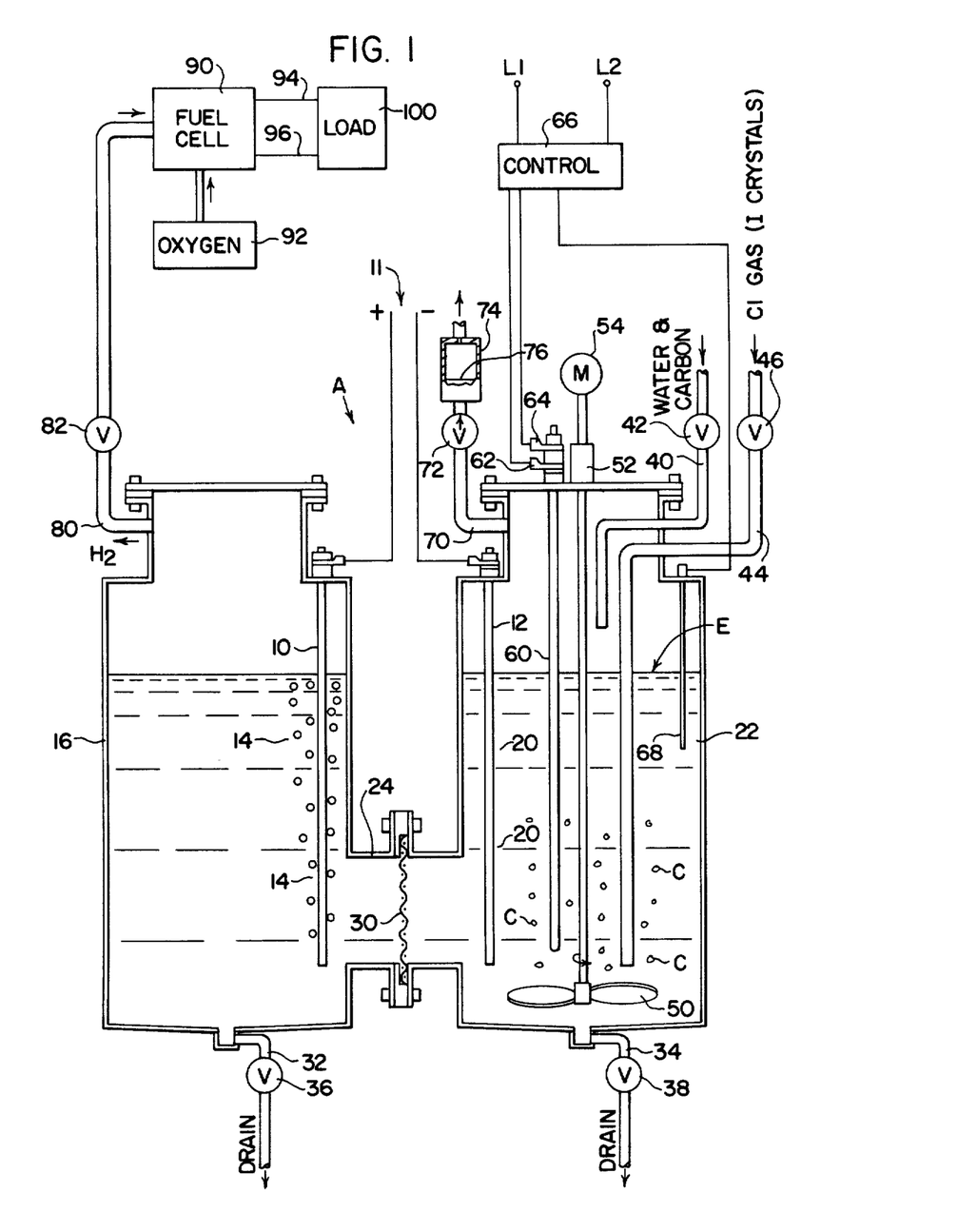
FIG. 1 is a schematic illustration of the apparatus for performing the method constituting the present invention.

Referring now to FIG. 1, there is schematically illustrated a device or cell for practicing the present invention of making hydrogen from water and preferably from water and ungraphitized carbon particles. In accordance with this illustrated embodiment, device or cell A includes a hydrogen electrode 10 and a halogen electrode 12 adjacent to which a halogen, such as chlorine or iodine, is released for immediate absorption into the electrolyte E formed from a solution of halogen acid corresponding to the halogen being released at electrode 12. An appropriate power supply 11 applies a decomposition voltage across electrodes 10, 12 to decompose the halogen acid in the electrolyte solution to produce hydrogen at the hydrogen collecting area 14 of compartment 16 and the halogen at the halogen collection area 20 of compartment 22. Compartments 16 and 22 are connected by an appropriate arrangement including a channel 24 separated by a membrane 30 which, in practice, is formed from Nafion produced by DuPont. This membrane is No. 120 Nafion and is approximately 10 mils in thickness. As is well known, Nafion is a perflorosulfonic acid based permselective plastic material.

Compartment 16 includes a lower drain 32 and compartment 22 includes a lower drain 34. Appropriate valves 36, 38, respectively, are used to control the level of liquid in these compartments. These drains can be used to remove sludge or other unwanted accumulated materials at the bottom of the respective compartments 16, 22. Within compartment 22, which not only forms the halogen collecting area but also the reaction zone or area for producing make-up halogen acid, there is provided an inlet 40 through which water and carbon particles C are introduced. An appropriate valve or other metering device 42 controls the amount of carbon particles and/or water which is introduced into the reaction area formed by compartment 22. At the start of the process, it is desirable to introduce halogen, such as chlorine, into the reaction compartment 22. This is schematically illustrated as a halogen inlet 44 controlled by an appropriate valve 46. An impeller 50 is supported in compartment 22 by an appropriate journal mount 52 and is driven by an electric motor 54 to maintain a liquid current flow outwardly and upwardly in the electrolyte E of compartment 22. Consequently, the electolyte in the reaction zone is agitated and continuously circulated. This maintains the carbon particles C in suspension within the electrolyte of compartment 22. In practice, the electrolysis produces sufficient heat to maintain the electrolyte in the reaction zone at above about 80° C. This temperature facilitates the chemical reaction in area 20. At first it may be necessary to heat the electrolyte. This can be done with cal rod 60 connected across terminals 62, 64. An electrical heating control 66 senses the electrolyte temperature by thermocouple 68 and controls heating element 60. During continued use the electrolysis heat is sufficient to maintain the level of heat in the reaction zone. As previously described, the carbon particles C react with the water to form carbon dioxide which accumulates in the upper portion of compartment 22. Since the carbon dioxide is substantially insoluble in the electrolyte E, an appropriate vent 70 is provided to allow escape of the carbon dioxide through a one-way check valve 72 connected to a water trap 74 containing a body of water 76. This body of water absorbs and dissolves any halogen which may escape with the carbon dioxide through vent 70. As the concentration of halogen within the water body 76 increases, the liquid can be drained and replaced by fresh water to maintain an arrangement for separating escaping halogen from the carbon dioxide which is released in the reaction compartment 22.

Referring now to compartment 16, this compartment includes a hydrogen collection line 80 including a valve 82 to allow escape of hydrogen gas from compartment 16 for appropriate subsequent use, such as direct burning or eletrical generation by a fuel cell. In the schematically illustrated apparatus for performing the method of the present invention, the hydrogen is used as the fuel in a fuel cell 90 which is also supplied with oxygen from an appropriate oxygen source 92. In this manner, an electrical potential is created across leads 94, 96 of fuel cell 90, which leads are used to power any appropriate load, schematically illustrated as load 10.

The cell or device A is used to electrically decompose the halogen acid in the solution which constitutes electrolyte E. The concentration of the halogen acid in the electrolyte is an important feature to maintain the general efficiency of device or cell A. The voltage across electrodes 10, 12 is below the decomposition voltage for water; therefore, the water which is used with the halogen acid is not electrically decomposed by the electrolysis process. Thus, the water within the electrolyte forms a solution of halogen acid for electrolysis of the acid. One of the features of the present invention is an arrangement for increasing the concentration of the halogen acid within the water forming the electrolyte solution. This requires hydrogenation of the halogen released by electrode 12, which halogen is dissolved in electrolyte E. Thus, the halogen released during the electrolysis process is immediately dissolved into the solution. The dissolved halogen is then hydrogenated within compartment 22 to form additional halogen acid for the electrolysis process. When the cell or device A uses chlorine as the halogen, hydrochloric acid is formed in the electrolyte. Because of the high concentration of the hydrochloric acid within the electrolyte solution, there is an insignificant amount of hypochlorous acid in the electrolyte. Thus, the over-voltage or over potential associated with oxygen is not a factor in the decomposition process between electrodes 10, 12.

Figure 2:
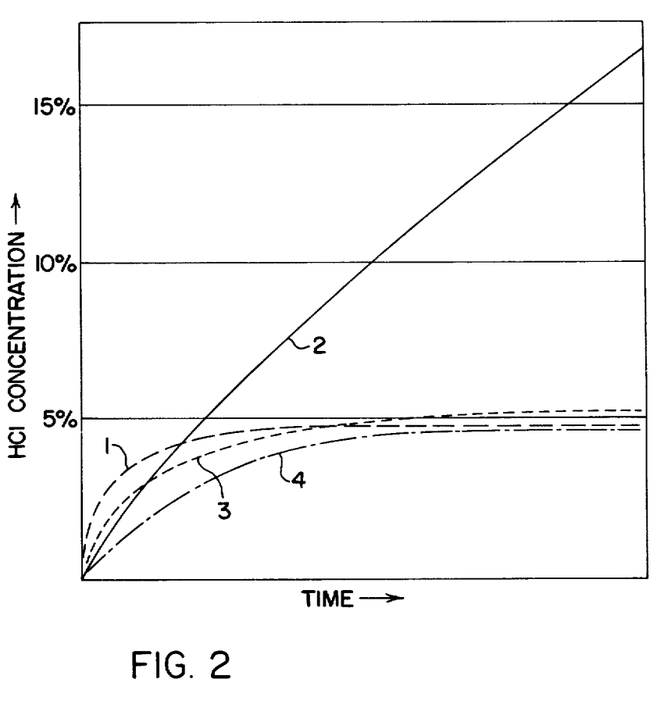
FIG. 2 is an acid concentration graph illustrating a characteristic of certain materials used in the reaction zone or area of the method constituting the present invention.

To increase the concentration of the halogen acid, an agent is used in the reaction area of compartment 22 to promote the hydrogenation of the halogen. In the preferred embodiment as will be described with respect to Example I, the agent is ungraphitized carbon particles having a relatively small size. This carbon is oxidized to form carbon dioxide as previously discussed so that the energy of the carbon is used in the chemical process involved in the creation of the halogen acid which is subsequently electrically decomposed in the electrolysis aspect of device or cell A. By increasing the hydrogenation of the halogen, such as chlorine, dissolved in the electrolyte E, the concentration of the acid in the electrolyte solution can be drastically increased over other processes wherein halogen is absorbed into water to form acids. In the past, when halogen is absorbed in a water solution, a very low acid concentration was obtainable, i.e. below about 3%. Thus, absorption of halogen in water to produce halogen acid was not useful for efficient electrolysis of the resulting acid solution. It has been found that chlorine, bromine and iodine can be continuously dissolved into the aqueous acid solution formed by these halogens and that the dissolved halogens can be hydrogenated in the presence of carbon particles to produce make-up halogen acids at concentrations higher than about 3%. It was found that graphitized carbon promotes hydrogenation of the disclosed halogen into the halogen acid solution at a rate which diminishes sharply as added acid strength increases. This concept is illustrated in curve 1 of FIG. 2. Thus, in hydrochloric acid, carbon particles which are graphitized particles promote hydrogenation of the acid at a relatively rapid rate until a concentration is obtained, which concentration is found to be approximately 5%. Thus, graphitized carbons can be used if the concentration of the hydrochloric acid or other halogen acid is to be relatively low. However, higher concentration of the halogen acids produces a superior and more efficient electrolysis process. It has been found that if the carbon particles are ungraphitized carbon, they promote the hydrogenation of the dissolved halogen into the acid solution at a rate which does not diminish as the concentration of the acid increases at least to a concentration of 20%-30%. This is shown in curve 2 of FIG. 2. For this reason, the preferred embodiment of the present invention uses ungraphitized carbon. By using ungraphitized carbon particles as the energy source for hydrogenation of dissolved halogen within electrolyte E, the carbon of the particles is consumed to form carbon dioxide. Consequently, carbon is used in the process of making hydrogen so that the energy of the carbon is released in the process. This energy is used to provide hydrogen which has vastly superior burning and energy creating characteristics then the carbon. For this reason, ungraphitized carbon is preferred in the present invention and the invention is directed to the concept of converting carbon in the presence of water into hydrogen wherein carbon dioxide is formed as a by-product. FIG. 2 also shows curves 3 and 5 which are related to the hydrogenation by catalysts other than graphitized carbon, within compartment 22. The catalysts used to produce these two curves are ruthenised titanium and platinised titanium, respectively. As can be seen in FIG. 2, the two catalysts, which can be used with added water only in the reaction zone 22, produces a concentration of hydrochloric acid or other halogen acid generally comparing to the graphitized carbon of curve 1 which acts as a catalyst. FIG. 2 illustrates that the use of ungraphitized carbon as shown in curve 2 is the preferred source of energy for the reaction within reaction chamber 22. By using ungraphitized carbon, the concentration of the halogen increases substantially to approximately 20% hydrochloric acid. The material used in creating the curves of FIG. 2 was ATJ graphite from Union Carbide Corporation as the graphitized carbon. The ungraphitized carbon was Grade 37 coke-carbon from Airco Speer Corporation. This ungraphitized carbon is used in Example I as will be described later. The ruthenised titanium was prepared by the well known method of air heating porous titanium dipped in a ruthenium chloride solution. The platinised titanium, was prepared by a well known method of air heating porous titanium dipped in a chloroplatinic acid solution. In FIG. 2 it is noted that there is a rapid increase in the halogen acid concentration in a solution containing dissolved halogen below about 3% concentration. A very slow increase in concentration beyond about 5% of halogen acid was found for all the materials, except the ungraphitized carbon. The concentration of the halogen acid when using ungraphitized carbon is a substantially constant rate even at the lower levels and this rate continues for an acid concentration within water of up to and beyond about 20% acid in solution. Thus, a dissolved halogen is continuously hydrogenated when using ungraphitized carbon. When using the other three agents, the hydrogenation of the halogen continues until the solution reaches about 5% acid. At this point, hydrogenation of the halogen essentially stops. Still, the 5% concentration is higher than the hydrogenation level obtainable without the selected agents. Thus, any of the four materials as so far described and illustrated graphically in FIG. 2 can be used to increase the hydrogenation level of the absorbed halogen within an acid solution used for the electrolyte in device or cell A. The ungraphitized carbon is the preferred hydrogenation material.

Figure 3:
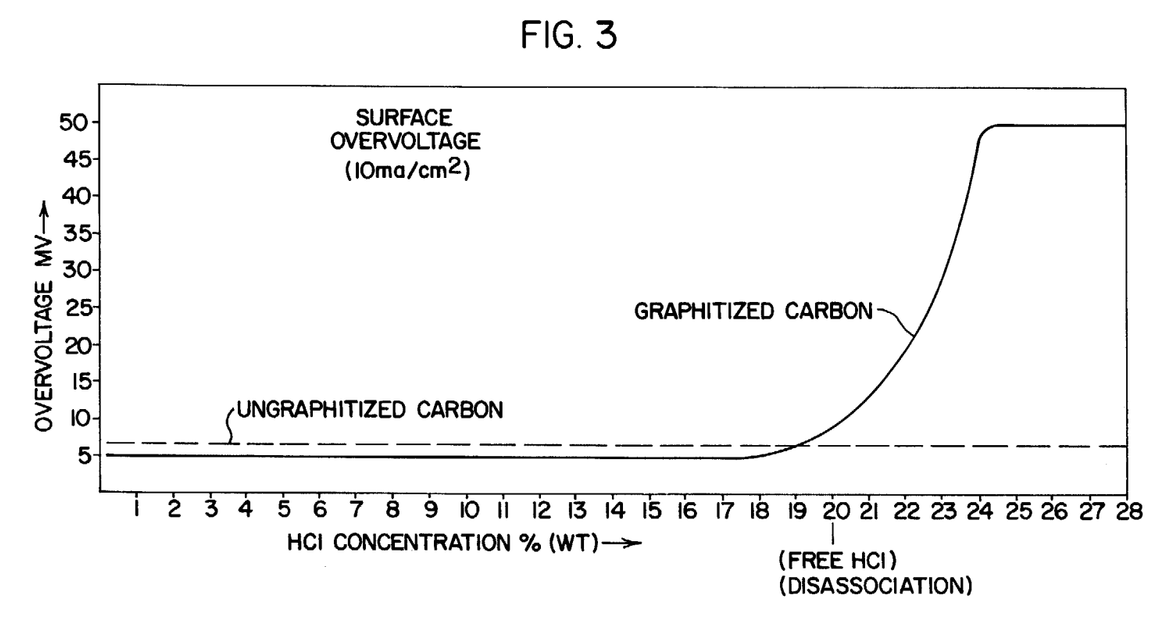
FIG. 3 is a graph illustrating the over-voltage characteristics of ungraphitized carbon compared to graphitized carbon which is theorized as the reason ungraphitized carbon will allow a substantially higher hydrogenation of the halide dissolved in the electrolyte of the present invention.

Although the reason for the continued hydrogenation of the chlorine or other halogen beyond a low level when using ungraphitized carbon is not known it is believed that this phenomenon is related to the over potential characteristics of ungraphitized carbon in a halogen acid solution. This concept is shown in FIG. 3 wherein the over potential or over-voltage in millivolts for ungraphitized carbon and graphitized carbon are compared. This graph was constructed by using electrodes of graphitized and ungraphitized carbon in different concentrations of hydrochloric acid and measuring the over-voltage at these concentrations. In this graph, it is noted that both the ungraphitized and graphitized carbon retain a relatively low over potential up to approximately 20% hydrochloric acid and this is the percentage of hydrochloric acid at which the hydrogen chloride commences to disassociate from the water. Thereafter, the graphitized carbon substantially increases its over potential with respect to the halogen whereas ungraphitized carbon continues on at approximately the same over potential or over-voltage level. Thus, the ungraphitized carbon continues to retain a relatively low over-voltage or over potential. At the surface of the carbon particles in the present invention, the hydrogenation of the halogen takes place. The concentrations of the halogen acid at the particle surfaces is relatively higher than the total acid solution concentration because the produced acid accumulates at the reaction surface. Consequently, the ungraphitized carbon continues to hydrogenate the halogen at the carbon surfaces whereas the graphitized carbon has a substantially higher over potential or over-voltage at this level and stops hydrogenation at about 18% acid in the area of the carbon surfaces. This produces an acid concentration within the total electrolyte E of approximately 5% whereas the capability of the ungraphitized carbon to retain a low over-voltage or over potential continues to hydrogenate even though the concentration of the halogen acid at the surface of the carbon increases substantially above the 18-20% solution or concentration level.

The actual test recorded in FIG. 3 relates to over-voltage or over potential which is generally the voltage or potential greater than the theoretical potential to produce a given electrochemical reaction. To obtain the chart shown in FIG. 3 to illustrate the relationship between graphitized and ungraphitized carbon as an over potential factor, the over-voltage between two electrodes and hydrochloric acid having various concentrations was measured at the electrode. Ten milliamps per square inch of current density was used. As the concentration was increased, the over potential for the ungraphitized carbon electrode was substantially constant at about 7 millivolts at 5% hydrochloric acid concentration and raised in a substantially uniform manner to about 8 millivolts at 37% concentration of hydrochloric acid. As to graphitized carbon electrode, the over potential was about 5 millivolts over a range of concentration of 5-18% acid within the solution. As the acid concentration was thereafter increased, the graphitized carbon electrode used in the test shows a very sharp over potential or over-voltage rise reaching about 45 millivolts at 24% concentration of hydrochloric acid. As the hydrochloric acid was then continued to increase in percentage, the graphitized carbon showed an over potential of about 45-46 millivolts through acid concentrations of 24-37% concentration. This relationship is illustrated in FIG. 3. Thus, since the ungraphitized carbon electrode in the test indicated no substantial increase in the over potential at the electrode as the concentration of acid increased, it has been theorized that when using ungraphitized carbon in the method of the present invention for the reaction particles within compartment 22, the over potential at the carbon particle surfaces does not substantially increase even though the concentration of the acid within the reaction zone and adjacent the surface does increase. By the experiment using graphitized and ungraphitized carbon in hydrochloric acid as illustrated in FIG. 3, it is shown that the ungraphitized carbon does not have a substantial change in over potential with respect to a halogen, such as chlorine. This indicates that the over potential of the ungraphitized carbon particles remain substantially constant in the reaction zone 22 of device or cell A shown in FIG. 1. Thus, ungraphitized carbon is used in the preferred embodiment of the invention with all the halogens such as chlorine, bromine and iodine.

From the above description, the present invention involves a novel means of using coal or other carbon for the manufacture of halogen acids which are electrolytically decomposed into hydrogen. The by-product is carbon dioxide. The released halogen is dissolved into electrolyte and then hydrogenated within the reaction zone of the cell A to produce a continuous process wherein the dissolved halogen in a circulated electrolyte is rehydrogenated by the use of carbon. Since hydriodic acid has a much lower electrical disassociation voltage than water or hydrochloric acid, this acid can be used in a more efficient manner than hydrochloric acid. Examples II and III relate to the use of this halogen acid and improvements in the method of the present invention as they relate to hydriodic acid.

Figure 4:
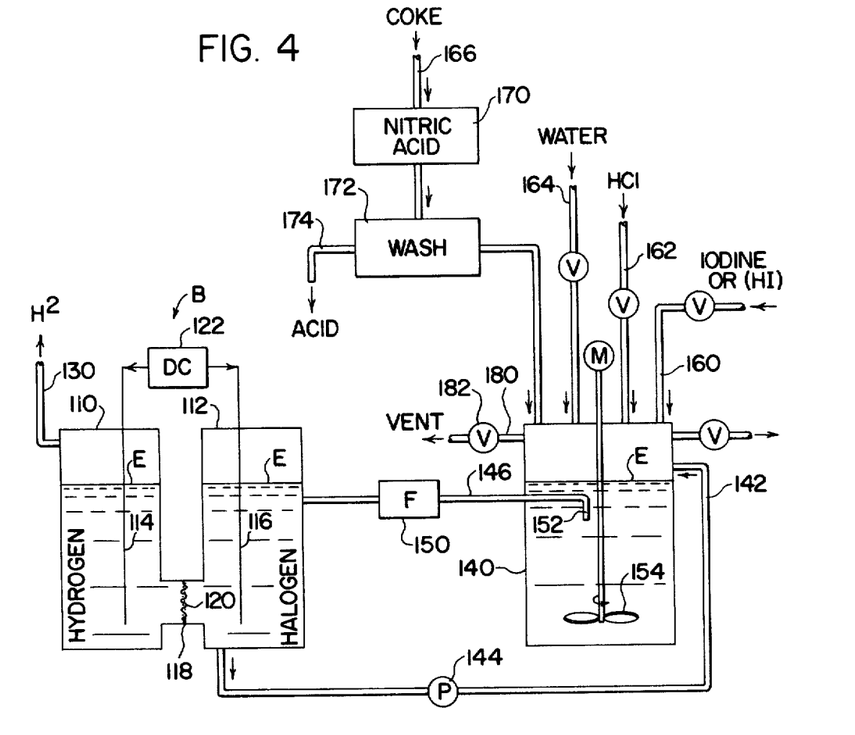
FIG. 4 is a schematic view illustrating a more detailed arrangement for performing the method constituting the preferred embodiment of the present invention.

Referring now to FIG. 4, this figure is a modification of the preferred embodiment shown in FIG. 1 and is used for a halogen acid as previously described. In this particular example, iodine is used as the halogen; however, the halogen could also be chlorine. Cell B includes hydrogen collecting compartment 110 and iodine collecting compartment 112. Within compartment 110 is a hydrogen collecting electrode 114. In a like manner, a halogen or iodine collecting electrode 116 is provided within compartment 112. A conduit 118 connects compartments 110, 112 and includes an appropriate membrane 120 as previously described. A D.C. power supply schematically illustrated as power supply 122 applies a D.C. voltage across electrodes 114, 116 which voltage is in the general range of 0.6-0.7 volts D.C. This voltage is selected to electrically decompose the hydriodic acid within electrolyte E. Of course, this same arrangement could be used for the other halogen such as chlorine and bromine. A hydrogen outlet 130 directs hydrogen from compartment 110 to an appropriate storage or using device. In this illustrated embodiment, a separate reaction tank 140 is provided through which is continuously circulated the electrolyte E by an appropriate inlet 142 having a pump 144. This pump pumps dissolved halogen and the electrolyte into the reaction tank 140. The heat caused by the electrical decomposition process is sufficient heat to retain necessary reaction temperature within tank 140. Thus, additional heat is not required and the electrolyte within tank 140 can be heated to the boiling point if sufficient waste heat is created by cell B. Outlet 146 directs electrolyte E from reaction tank 140 to cell B through an appropriate filter 150 which removes any unwanted impurities within the electrolyte as it is being circulated back to cell B. A center intake 152 is used to collect the electrolyte from tank 140. Impeller 154 circulates the electrolyte in tank 140 outwardly so that the carbon particles are generally spaced from intake 152 and are not directed toward filter 150. In this illustrated embodiment of the invention, line 160 is used for introducing iodine or HI into the tank at the start-up of the process. Thereafter, make-up iodine is not generally required in the continuous operation process. A line 162 allows the introduction of hydrochloric acid into the reaction chamber 140. As will be described later, hydrochloric acid has a decomposition voltage substantially higher than the hydrogen iodine or hydriodic acid and thus can be used with water within electrolyte E without actually entering into the electrolysis process. The hydrochloric acid has an advantage which will be described later. It reduces the voltage necessary between electrodes 114,116. Any reduction in voltage is a savings in electrical energy which thus increases the electrical efficiency of a device using the present invention. Line 164 is used for introducing water into the reaction chamber 140. The purpose of the water has been previously described. In accordance with this particular illustration of the invention, coke is introduced through line 166 and is treated by nitric acid in tank 170. Thereafter, the coke particles are washed in a tank 172 and the residual acid is removed by line 174. Thus, the nitric acid treated coke particles are introduced in the reaction chamber 140 in the desired amount to promote hydrogenation of the iodine dissolved within electrolyte E pumped from cell B through inlet 142. An appropriate vent for the carbon dioxide gas is illustrated as line 180 having a check valve 182. Of course, a water trap could be used as previously described with respect to the embodiment of the cell A as shown in FIG. 1. The general operation of cell B and its associated reaction chamber 140 is the same as the operation of device or cell A shown in FIG. 1. The advantages of using the nitric acid washed carbon particles and hydrochloric acid in an iodine process are explained hereinafter and used in Example III. Again, the device shown in FIG. 4 produces hydrogen by the use of water and ungraphitized carbon particles. Of course, graphitized carbon could be used. In the former instance, the carbon is consumed in the chemical process used in producing the halogen acid necessary for the electrolysis process carried out by cell B.

EXAMPLE I

A reaction or chlorine compartment of cell A had a capacity of about 500 ml and was filled with 300 ml of water. This fills the hydrogen compartment, which was the same general size, to this same level. The hydrogen electrode was graphite which had been platinised by dipping it in chloroplatinic acid and heating it in air. This reduces the electrode over potential with hydrogen. In a similar manner, the chlorine electrode was formed from graphitized carbon or graphite and was boiled in nitric acid for 30 hours. The intermediate membrane between the compartments was formed from DuPont 120 Nafion with a thickness of 10 mils. The hydrogen ions pass between the chambers to establish electrical continuity and generally uniform acid concentration.

Approximately 20 grams of powdered coke was charged into the reaction compartment and the water was heated to about 80° C. The coke was standard ungraphitized carbon sold by Airco Speer Corporation as Grade 37 coke-carbon. The particle size was such that it passed through a standard 6 mesh screen and not through a standard 14 mesh screen. This powder was then slurried in the water and held in suspension by the impeller. Thereafter, chlorine gas was introduced into the slurry of the reaction compartment and the HCl concentration continued to raise to between 20%-25% by weight, whereas when using the same procedure with ATJ graphite from Union Carbide Corporation, ruthenised titanium and platinised titanium instead of the ungraphitized coke, the concentration peaked out at about 5% HCl. To reach the 25% HCl, about 140 grams of chlorine reacted with the 20 grams of coke to produce about 140 grams HCl in solution.

A voltage of 1.2 volts D.C. was applied across the electrodes to produce about 1.0 amperes of current flow through the electrolyte. About 1.1 volt D.C. was used for decomposition of the acid. Hydrogen was produced at the hydrogen electrode and directed from the unit. The chlorine produced at the chlorine electrode was reused to combine with water and carbon to produce make-up HCl. Carbon dioxide was released by this process and was passed through water bath 76. In the process 20 grams of water and 6 grams of the coke carbon are consumed per hour to produce 2 grams of hydrogen per hour while maintaining the acid concentration at about 20%.

After the process came on line, the heat generated by the $I^2R$ drop across the electrodes was sufficient to maintain the electrolyte at an elevated temperature above 80° C. Heater 60 was disconnected during the process. Consequently, 6 grams of carbon produce 2 grams of hydrogen per hour with a theoretical heating capacity of 265 Btu. The electrical energy used per hour is about 66 watt-hours which converts into approximately 226 Btu per hour. The electrical energy of 226 Btu produced hydrogen with a converted heating capacity of 264 Btu.

EXAMPLE II

The same basic process as used in Example I was performed in cell A with hydriodic acid as the electrolyte acid. In this instance the voltage was reduced to about 0.6–0.7 volts D.C. and about 2 grams of coke were used as make-up ungraphitized carbon per hour. This example produced 2 grams of hydrogen at a heating capacity of 264 Btu with 32 watt hours or 110 Btu input per hour of electrical energy.

Hydrogenation Effectiveness Factors

A study of the halogens, chlorine, bromine and iodine, for use in the processes described in Examples I and II indicated several factors which affect the effectiveness of the processes, but not the basic theory or operability of the processes. Hydrogenation of the halogens, even at concentrations about 3%–5%, allows the system to operate effectively. The hydrogenation rate of the halogen is inversely related to the free energy of the halogen acid which is lowest for the chlorine acid and is highest for the iodine acid. Consequently, hydrogenation, or acid formation, is more rapid and easily accomplished with hydrochloric acid. However, the solubility of the halogen in its respective acid is greatest for iodine in hydriodic acid and less for chlorine in hydrochloric acid. Taking these factors into consideration, certain modifications in the rate of acid formation in the coke-water-halogen system have been discovered.

By treating the coke with nitric acid by passing the coke through hot nitric acid, the rate of hydrogenation of the halogens in the coke process is increased. The increase in hydrogenation rate is a factor of about ten for iodine and substantially less for chlorine. The reason for this action is not known; however, it is theorized that the nitric acid reduces the absorption of the halogen into the coke or ungraphitized carbon, i.e. carbon which has not been heated to over about 2000° C. The absorption reduction appears to result in a reduced halogen over-potential at the carbon surface and, thus, increases the rate of hydrogenation. The iodine is affected more by this process. In summary, one improvement in the basic method of Examples I and II is the pretreatment of the coke particles by nitric acid.

Since solubility of the halogen in its acid is important to ultimate hydrogenation of the invention, an improvement in solubility is advantageous. In practice this has been accomplished by adding sodium chloride to iodine acid. This salt increased the rate of solubility of iodine in hydriodic acid, but decreased this rate for chlorine in hydrochloric acid. Consequently, the rate of hydrogenation may be adjusted by a salt, such as sodium chloride.

The rate of reaction is also affected by the free energy of the acid at the carbon surface of the particles. As previously stated, the higher the free energy, the lower the hydrogenation rate. It has been found that this rate can be affected by adding acids of a lower known free energy level to acids of higher free energy levels. For instance, if hydrochloric acid, having the lowest free energy of the halogens under consideration, is added to a system based upon hydrogen bromine or hydrogen iodide, the hydrogenation rate is increased. In a like manner, hydrobromic acid or hydrogen bromine can increase the hydrogenation rate of a hydrogen iodide system. This phenomenon apparently occurs because of the free energy modification at the carbon surface. Also, these added acids are not decomposed because they require higher voltage than used for the base acid.

In summary, factors such as treatment of the coke with nitric acid, using a solubility modifier and adding a second halogen acid to the system are helpful in controlling the effectiveness of the basic system described in Examples I and II. Sufficient solubility of the halogen in its acid is needed to capture the released halogen at the halogen electrode for hydrogenation in the system. In addition, low over potential of the ungraphitized carbon at higher concentrations retains the hydrogenation process beyond the normal lower concentrations obtained by merely reacting halogen with water.

The interaction of the experimentally determined effectiveness factors for the general process of Examples I and II can be manipulated to obtain process reactions having further improved electrical and chemical characteristics. These factors act upon the solubility and over potential of the carbon to control and facilitate hydrogenation at higher acid concentrations, in the range of 5%-25% in the hydrochlorine for example.

EXAMPLE III

Another example was performed using the effectiveness factors experimentally obtained and explained above. In this example the three hydrogenation rate modification factors were used for a system similar to Example II using hydrogen iodide in the electrolyte solution. Hydrogen was obtained from the electrolyte formed by hydrogenation of iodine which is the preferred system of the present invention. In this example, cell B as shown in FIG. 4 was used. The ungraphitized carbon, i.e. coke, was treated with nitric acid and then heated to remove excess nitric acid. This produced an increase in the iodine hydrogenation rate; however, the small amount of nitric acid residue on the carbon particles exhibited no apparent deleterious effect on the total system. In this example a small amount of titanium tetrachloride was added which is a salt to further increase the hydrogenation rate and reduce the corrosiveness of the acid mixture. This salt increased the solubility of the electrode released iodine. A substantial amount of hydrochloric acid was used with the hydrogen iodine electrolyte. The hydrochloric acid lowered the decomposition voltage of the HI electrolyte; however, it did not enter into the electrolysis since the voltage across the electrodes was about 0.3 volts D.C. Without a substantial amount of HCl, the voltage of the HI cell was about 0.6–0.7 volts D.C. This voltage of 0.3 volts is sufficient to electrically decompose the HI, but, not the HCl, which requires about 1.2–1.3 volts. To obtain a 0.3 volt decomposition voltage for the HI cell without the HCl additive, the HI concentration would need to be about 50% HI by weight in water. In this example the 0.3 volt decomposition of HI electrolyte was obtained by 20% HCl by weight and 1% by weight HI. Consequently, this example produced increased hydrogenation of iodine, reduction in the decomposition voltage of HI and reduction in the amount of iodine required, which is considerably more expensive than chlorine. This example contained:

(1) Airco Speer Grade 37 coke carbon boiled for 8 hours in constant boiling nitric acid washed in water.
(2) 20% by weight HCl.
(3) 1% by weight HI.
(4) 1% by weight titanium tetrachloride.
(5) Remainder water.

The temperature of the cell was about 108° C. and the electrolyte was stirred to prevent settling of the carbon particles. The decomposition voltage to produce hydrogen was 0.3–0.4 volts in D.C. and hydrogen was produced at 2 amperes of current. The cell was sealed from air to prevent oxidation of the HI electrolyte.

Of course, other modifications could be made in the various processes illustrated in carrying out the present invention without departing from the scope of the invention which relates to the concept of producing hydrogen from the electrolysis of a halogen acid electrolyte which absorbs the released halogen and circulates the absorbed halogen with the electrolyte in a reaction area to rehydrogenated the halogen with the use of water and water or carbon. The released hydrogen itself it not required for the rehydrogenation and is totally useful for external purposes such as heating or generation of electricity, to name two examples.

Modifications

Figure 5:
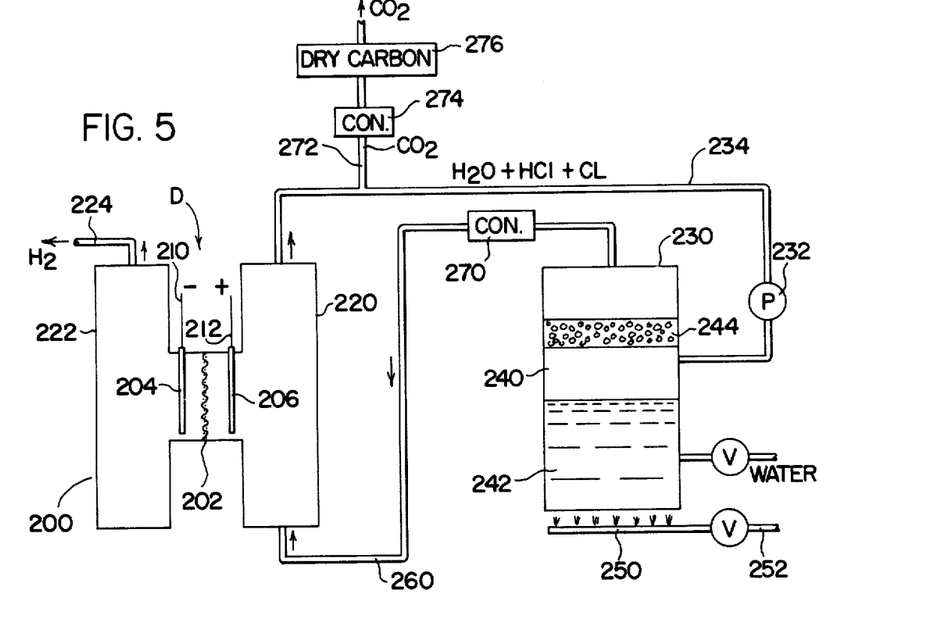
FIG. 5 is a schematic view illustrating a system for using the present invention in a gaseous mode; and, FIG. 6 is a schematic view illustrating the use of a feature of the invention for stripping chlorine.

Referring now to FIG. 5, a modification of the preferred embodiment is illustrated. In this embodiment the cell D includes a housing 200 with a Nafion membrane 202 having surface mounted electrodes 204, 206. A voltage source applies a working voltage across leads 210, 212 so that the membrane produces an electrolysis function. A halogen compartment 220 provides a gaseous acid vapor at the electrode face of the membrane to allow electrolysis to form a halogen gas in compartment 220. At the same time, hydrogen is separated and accumulated in compartment 222, from which it exits by way of conduit 224.

Disassociated halogen, in the example chlorine, is in gaseous form from compartment 220 to a reaction tank or area 230 by a means represented as pump or blower 232 in conduit 234. Vapor from conduit 234 is forced into chamber 240 defined by a body of water 242 and an upper bed of ungraphitized carbon 244. Burners 250 in line 252 heat the water in body 242 to the boiling temperature to produce water vapor. This vapor together with the vapor from circuit 234 reacts with the carbon to hydrogenate the chlorine into hydrochloric acid vapors which are carried by conduit 260 to the lower portion of halogen compartment 220 wherein the electrolysis releases chlorine for a continuous cycle. Condenser 270 removes water vapor. The heat of the electrolysis process maintains the vaporized condition of the circulated constituents in compartment 220 and conduit 234.

To remove the carbon dioxide from the closed loop, a vent 272 having a small diameter, i.e. about 1/20th of the area of conduit 234, is provided in the coolest area of the circuit. A condenser 274 condenses the water vapor which absorbs any HCl. A large volume of carbon dioxide with traces of halogen then passes from the condenser. A dry carbon bed 276 then removes the halogen, if necessary.

Figure 6:
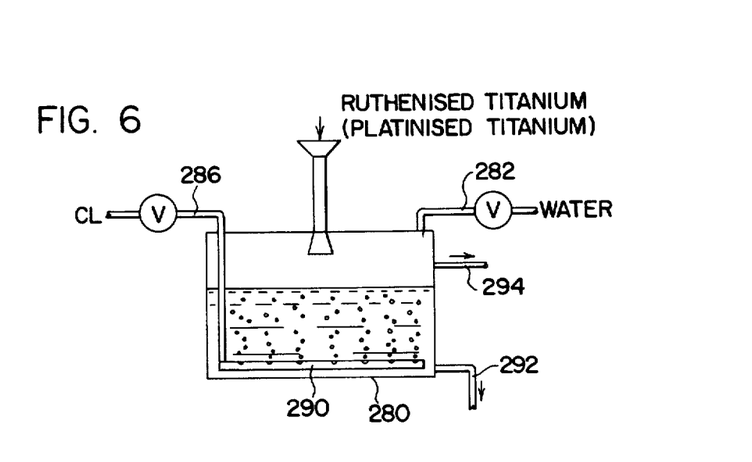

The catalyst concept used in the present invention can be used in stripping a halogen from a gas stream since it increases the obtainable concentration of halogen in water. FIG. 6 shows a system for utilizing this aspect. A tank 280 is partially filled with water from valved conduit 282. Graphitized carbon, ruthenised titanium, platinised titanium or mixtures thereof, in particle form, is introduced into the water through feed line 284. A gas stream, illustrated as chlorine, is directed by valved circuit 286 into a diffuser 290 at the lower portion of tank 280. As the halogen bubbles through the water in the presence of the catalyst, the halogen is formed into hydrohalic acid to higher concentrations than obtained by water itself. A drain 292 ultimately drains tank 280. By this arrangement, more chlorine can be stripped from a gas stream. Any insoluble gases pass from tank 280 by outlet 294.

Having thus described the invention, it is claimed:

1. A method of forming hydrogen by electrolysis of a halogen acid solution produced from a reaction process using oxidation of carbon particles as an input energy source in a solution water, said method comprising the steps of:
   (a) providing an electrolysis cell with a hydrogen electrode in a hydrogen collection area of said cell and a halogen electrode for producing electrochemically released halogen in a halogen collecting area of said cell;
   (b) providing a solution of said halogen acid in said cell, said solution forming a liquid electrolyte with a known total decomposition electrode voltage and electrically connecting said electrodes;
   (c) continuously producing said halogen acid electrolyte by dissolving the electrochemically released halogen at the halogen electrode into said halogen acid solution at said halogen collecting area and reacting said dissolved halogen in a reaction area communicated with said halogen collecting area with carbon particles and solution water while said reaction area is at a reaction temperature above ambient temperature, and is agitated to maintain said carbon particles in suspension;
   (d) applying a driving voltage across said electrode, said driving voltage being at least said known total decomposition electrode voltage; and,
   (e) removing said hydrogen for said hydrogen collecting area of said cell.

2. The method as defined in claim 1 wherein said carbon particles are formed from ungraphitized carbon.

3. The method as defined in claim 2 wherein said acid is hydriodic acid having said known electrode decomposition voltage.

4. The method as defined in claim 3 including the use of a second halogen acid to said electrolyte, said second halogen acid having a decomposition voltage substantially greater than said driving voltage.

5. The method as defined in claim 4 wherein said second halogen acid is hydrochloric acid.

6. The method as defined in claim 2 wherein said carbon particle size is such that said particles pass through a 6 mesh screen.

7. The method as defined in claim 2 including the addition of a second halogen acid to said electrolyte, said second halogen acid having a decomposition voltage substantially greater than said driving voltage.

8. The method as defined in claim 2 including the additional steps of:
   (f) pretreating said particles by passing them through a solution of nitric acid; and,
   (g) washing said nitric acid from said particles.

9. The method as defined in claim 1 wherein said acid is hydriodic acid having said known electrode decomposition voltage.

10. The method as defined in claim 9 including the use of a second halogen acid to said electrolyte, said second halogen acid having a decomposition voltage substantially greater than said driving voltage.

11. The method as defined in claim 10 wherein said second halogen acid is hydrochloric acid.

12. The method as defined in claim 1 wherein said carbon particle size is such that said particles pass through a 6 mesh screen.

13. The method as defined in claim 1 including the use of a second halogen acid to said eletrolyte, said second halogen acid having a decomposition voltage substantially greater than said driving voltage.

14. The method as defined in claim 1 wherein said reaction temperature is in the general range of 80° C. to the boiling temperature of said halogen acid solution.

15. The method as defined in claim 1 including the additional step of:
   (f) circulating said electrolyte through said reaction zone for maintaining said reaction temperature.

16. The method as defined in claim 1 including the additional steps of:
   (f) pretreating said particles by passing them through a solution of nitric acid; and,
   (g) washing said nitric acid from said particles.

17. A method of forming hydrogen by electrolysis of a halogen acid solution produced from a reaction process using electrically released halogen dissolved in the solution, said method comprising the steps of:
   (a) providing an electrolysis cell with a hydrogen electrode in a hydrogen collecting area of said cell and a halogen electrode for producing electrochemically released halogen in a halogen collecting area of said cell;
   (b) providing a solution of said halogen acid and a solution water in said cell, said solution forming a liquid electrolyte with a known total decomposition electrode voltage and electrically connecting said electrodes;
   (c) continuously producing said halogen acid electrolyte by dissolving substantially all of the electrochemically released halogen at the halogen electrode into said halogen acid solution at said halogen collecting area and reacting said dissolved halogen in a reaction area communicated with said halogen collecting area with the solution water in the presence of a catalyst selected from the group consisting of graphitized carbon, ruthenised titanium and platinised titanium while said reaction area is at a reaction temperature above ambient temperature;
   (d) applying a driving voltage across said electrodes, said driving voltage being at least said known total decomposition electrode voltage; and,
   (e) removing said hydrogen from said hydrogen collecting area of said cell.

18. The method as defined in claim 17 including the use of a second halogen acid to said electrolyte, said second halogen acid having a decomposition voltage substantially greater than said driving voltage.

19. The method as defined in claim 17 wherein said reaction temperature is in the general range of 80° C. to the boiling temperature of said halogen acid.

20. The method as defined in claim 17 including the additional step of:
   (f) circulating said electrolyte through said reaction zone for maintaining said reaction temperature.

21. A method of forming hydrogen by electrolysis of a halogen acid solution produced from a reaction process using oxidation of carbon particles as an input energy source, said method comprising the steps of:
   (a) providing an electrolysis cell with a hydrogen electrode in a hydrogen collecting area of said cell and a halogen electrode for producing electrochemically released halogen in a halogen collecting area of said cell;
   (b) providing a solution of said halogen acid and a solution water in said cell, said solution forming a liquid electrolyte with a known total decomposition electrode voltage and electrically connecting said electrodes;

(c) continuously producing said halogen acid electrolyte by the sub-steps of:
  (1) dissolving the electrochemically released halogen at the halogen electrode into said halogen acid;
  (2) reacting said dissolved halogen in a reaction area with the solution water and carbon particles at a reaction temperature not exceeding generally the boiling temperature of said electrolyte;

(d) applying a driving voltage across said electrodes, said driving voltage being at least said known total decomposition electrode voltage; and, (e) removing said hydrogen from said hydrogen collecting area of said cell.

22. A method of forming hydrogen by electrolysis of a hydrogen halide produced from a reaction process using ungraphitized carbon particles as an input energy source, said method comprising the steps of:

(a) providing an electrolysis cell with a hydrogen electrode in a hydrogen collecting area of said cell and a halogen electrode in a halogen collecting area of said cell;

(b) providing said hydrogen halide in said cell, said hydrogen halide forming a liquid electrolyte with a known total decomposition electrode voltage and electrically connecting said electrodes;

(c) continuously producing said halogen halide by reacting halogen released at said halogen electrode in a reaction area with the water and ungraphitized carbon particles;

(d) applying a driving voltage across said electrodes, said driving voltage being at least said known total decomposition electrode voltage; and, (e) removing said hydrogen from said hydrogen collecting area of said cell.

23. A method as defined in claim 22 wherein said hydrogen halide is in gaseous form.

24. A method as defined in claim 22 wherein said hydrogen halide is in an aqueous solution.

* * * * *